United States Patent
Laberteaux et al.

(10) Patent No.: US 12,387,223 B2
(45) Date of Patent: Aug. 12, 2025

(54) MODULES, SYSTEMS, AND METHODS FOR INCENTIVIZING GREEN DRIVING

(71) Applicant: Toyota Motor Engineering & Manufacturing North America, Inc., Erlanger, KY (US)

(72) Inventors: Ken Laberteaux, Ann Arbor, MI (US); Karim Hamza, Mississauga (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 782 days.

(21) Appl. No.: 15/471,770

(22) Filed: Mar. 28, 2017

(65) Prior Publication Data
US 2018/0285885 A1 Oct. 4, 2018

(51) Int. Cl.
*G06Q 30/018* (2023.01)
*G06Q 20/10* (2012.01)
(Continued)

(52) U.S. Cl.
CPC ........... *G06Q 30/018* (2013.01); *G06Q 20/10* (2013.01); *G07C 5/008* (2013.01); *G07C 5/0808* (2013.01); *G07C 5/0825* (2013.01); *G07C 5/0841* (2013.01); *H04L 9/3231* (2013.01); *H04L 9/3247* (2013.01); *G06Q 2220/00* (2013.01); *H04L 2209/84* (2013.01)

(58) Field of Classification Search
CPC .. G06Q 10/0639; H04L 63/0428; H04L 63/08
See application file for complete search history.

(56) References Cited

U.S. PATENT DOCUMENTS 8,498,792 B2 7/2013 Abboud et al.
8,552,851 B2 10/2013 Nakamura et al.
(Continued)

FOREIGN PATENT DOCUMENTS

EP 2036777 B1 3/2010
KR 101214900 B1 12/2012

OTHER PUBLICATIONS

Molchanov et al., "Multi-sensor System for Driver's Hand-Gesture Recognition", 2015, IEEE (Year: 2015).*

*Primary Examiner* — Patrick McAtee
*Assistant Examiner* — Sima Asgari
(74) *Attorney, Agent, or Firm* — Dinsmore & Shohl LLP (57) ABSTRACT

An authentication and verification module for incentivizing green driving includes one or more processors, network interface hardware configured to communicate with a remote server, one or more auxiliary sensors for outputting a verification signal, and one or more memory modules. The one or more memory modules store logic that, cause the authentication and verification module to: receive a diagnostic signal from an onboard diagnostics module of a vehicle, receive the verification signal from the one or more auxiliary sensors, compare the diagnostic signal with the verification signal, and transmit a driving behavior communication with the network interface hardware to the remote server when the verification signal and the diagnostic signal are within a predetermined threshold from one another. The authenticated driving behavior can then be used to calculate and assign appropriate incentives to the vehicle driver.

19 Claims, 5 Drawing Sheets

(51) Int. Cl.
*G07C 5/00* (2006.01)
*G07C 5/08* (2006.01)
*H04L 9/32* (2006.01)

(56) References Cited

U.S. PATENT DOCUMENTS

| | | | |
|---|---|---|---|
| 9,361,271 | B2 | 6/2016 | Mukhopadhyay et al. |
| 9,393,868 | B2 | 7/2016 | Slaton et al. |
| 2002/0183905 | A1* | 12/2002 | Maeda .................... B62D 41/00 |
| | | | 701/33.4 |
| 2009/0222338 | A1 | 9/2009 | Hamilton, II et al. |
| 2011/0056185 | A1 | 3/2011 | Bradley et al. |
| 2014/0052605 | A1* | 2/2014 | Beerle ................ G06Q 10/0833 |
| | | | 705/38 |
| 2014/0279707 | A1* | 9/2014 | Joshua ............... G06Q 30/0283 |
| | | | 705/400 |
| 2016/0150070 | A1* | 5/2016 | Goren .................. G08G 1/0112 |
| | | | 455/418 |
| 2016/0364921 | A1* | 12/2016 | Iyoda .................... G07C 5/008 |
| 2017/0039784 | A1* | 2/2017 | Gelbart .................... G07C 5/00 |
| 2017/0053461 | A1* | 2/2017 | Pal ........................ G08G 1/012 |

\* cited by examiner

MODULES, SYSTEMS, AND METHODS FOR INCENTIVIZING GREEN DRIVING

TECHNICAL FIELD

The present specification generally relates to modules, systems, and methods for incentivizing green driving and, more specifically, modules, systems, and methods for collecting data from vehicles and sending a driving behavior communication to a remote server.

BACKGROUND

Customers and automotive original equipment manufacturers (OEMs) may receive credit from various agencies for vehicles which achieve certain emission standards. For instance, California provides a credit to OEMs for the production of zero emission cars or the fleet production of cars meeting a minimum emission standard. However, such credit systems generally do not take into consideration automotive vehicles with internal combustion engines which are driven in a manner that meet the emission standards of hybrid or green vehicles. Nor does such a credit system take into consideration "green vehicles" which are driven in a manner commensurate with vehicles having an internal combustion engine.

Accordingly, a need exists for alternative modules, systems, and methods for incentivizing green driving behavior for vehicles.

SUMMARY

In one embodiment, an authentication and verification module for incentivizing green driving may include one or more processors, network interface hardware communicatively coupled to the one or more processors and configured to communicate with a remote server, one or more auxiliary sensors communicatively coupled to the one or more processors for outputting a verification signal, and one or more memory modules communicatively coupled to the one or more processors. The one or more memory modules store logic that, when executed by the one or more processors, cause the authentication and verification module to receive a diagnostic signal from an onboard diagnostics module of a vehicle, receive the verification signal from the one or more auxiliary sensors, compare the diagnostic signal with the verification signal, and transmit a driving behavior communication with the network interface hardware to the remote server when the verification signal and the diagnostic signal are within a predetermined threshold from one another.

In another embodiment, a system for incentivizing green driving may include an onboard diagnostics module comprising one or more diagnostic sensors, wherein the onboard diagnostics module outputs a diagnostic signal, network interface hardware communicatively coupled to the onboard diagnostics module and configured to communicatively couple the system with a remote server, and an authentication and verification module communicatively coupled to the onboard diagnostics module. The authentication and verification module may include one or more processors, one or more auxiliary sensors communicatively coupled to the one or more processors for outputting a verification signal, and one or more memory modules communicatively coupled to the one or more processors. The one or more memory modules store logic that, when executed by the one or more processors, cause the authentication and verification module to receive the diagnostic signal from the onboard diagnostics module of a vehicle, receive the verification signal from the one or more auxiliary sensors, compare the diagnostic signal with the verification signal, and transmit a driving behavior communication with the network interface hardware to the remote server when the verification signal and the diagnostic signal are within a predetermined threshold from one another.

In yet another embodiment, a method for incentivizing green driving may include receiving, with an authentication and verification module, a diagnostic signal from an onboard diagnostics module of a vehicle, receiving, with the authentication and verification module, a verification signal from one or more auxiliary sensors of the authentication and verification module, comparing the diagnostic signal with the verification signal, and transmitting a driving behavior communication with the network interface hardware to the remote server when the verification signal and the diagnostic signal are within a predetermined threshold from one another.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include authentication and verification modules, systems, and methods for incentivizing green driving. Embodiments described herein may use information from a vehicle's onboard diagnostics module and compare it to information received from one or more auxiliary sensors of an authentication and verification module. When the information received from the vehicle's onboard diagnostics module and the information received from the one or more auxiliary sensors substantially correspond with one another (e.g., are about the same or within some predetermined threshold), a driving behavior communication can be sent to a remote server. A credit of some sort may be applied to at least one of the driver or the manufacturer of the vehicle when the driving behavior communication or multiple driving behavior communications are indicative of the vehicle being driven in a green manner (i.e. an environmentally friendly manner). Such credit may provide incentives for drivers to operate their vehicles in a more environmentally friendly manner, which could also improve overall fleet performance. By comparing the measurements of the vehicle's onboard diagnostics module with a separate auxiliary sensor measurement, agencies or manufacturers applying a credit for green driving behaviors may be more assured that the measurements received are accurate. In some embodiments, the driving behavior communication may have a digital signature or encryption applied to the driving behavior communication prior to the driving behavior communication being sent to the remote server to further assure that the driving behavior communication has not been tampered with. The various authentication and verification modules, systems, and methods for incentivizing green driving will be described in more detail herein with specific reference to the corresponding drawings.

Figure 1:
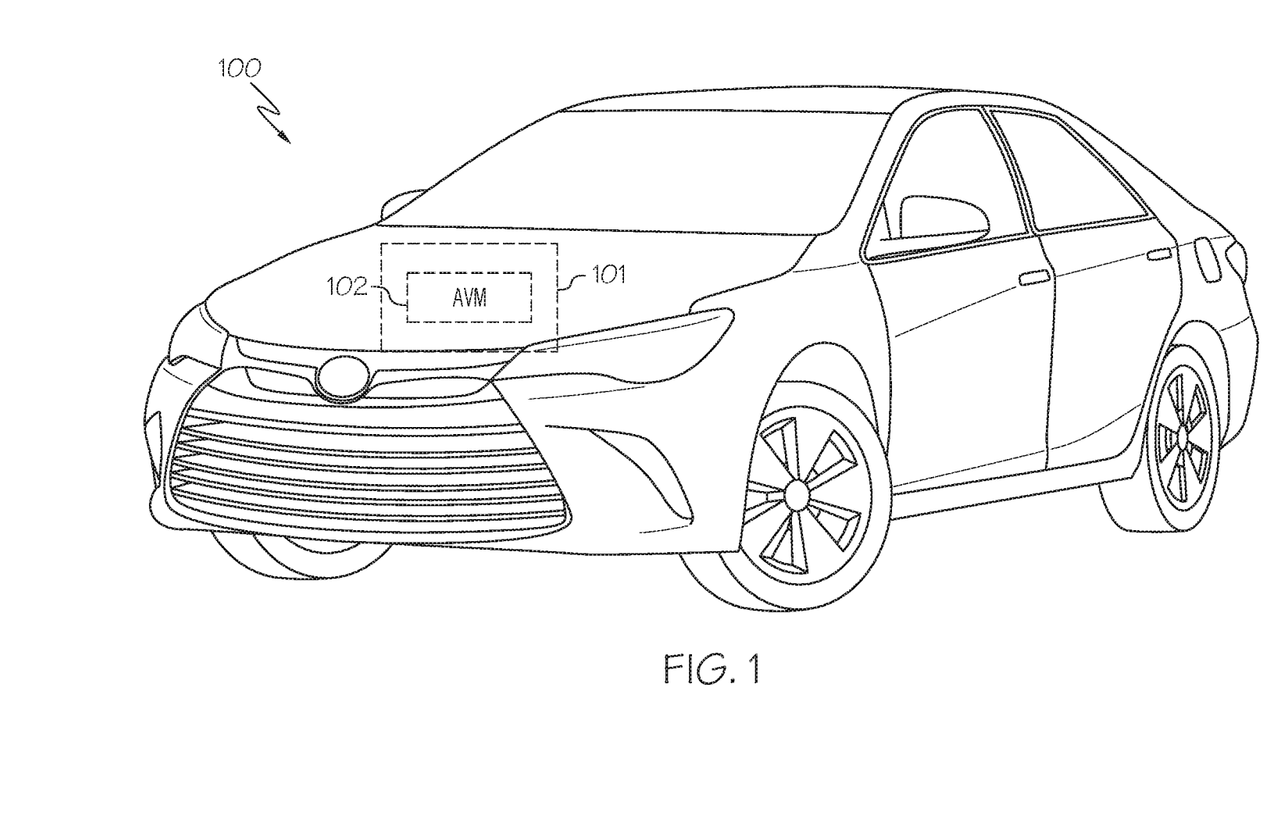
FIG. 1 depicts a vehicle including a system for incentivizing green driving having an authentication and verification module, according to one or more embodiments shown and described herein.

Referring now to FIG. 1, a vehicle 100 having a system 101 for incentivizing green driving and an authentication and verification module 102 is generally depicted. It is noted that while the vehicle 100 is depicted as an automobile, the vehicle 100 may be any passenger vehicle such as, for example, a terrestrial, aquatic, and/or airborne vehicle. In some embodiments, the vehicle 100 may be an autonomous vehicle or a partially autonomous vehicle. When referring to autonomous or partially autonomous vehicles, it is meant to refer to vehicles having at least one drive mode wherein a human operator is not necessary to guide the vehicle 100. As will be described in greater detail herein, in some embodiments, the vehicle 100 may have a super-eco driving mode wherein certain driving parameters of the vehicle 100 are limited so as to be performed within predetermined green driving standards. For example, such predetermined green driving standards may be set by state or federal government regulatory agencies.

Figure 2:
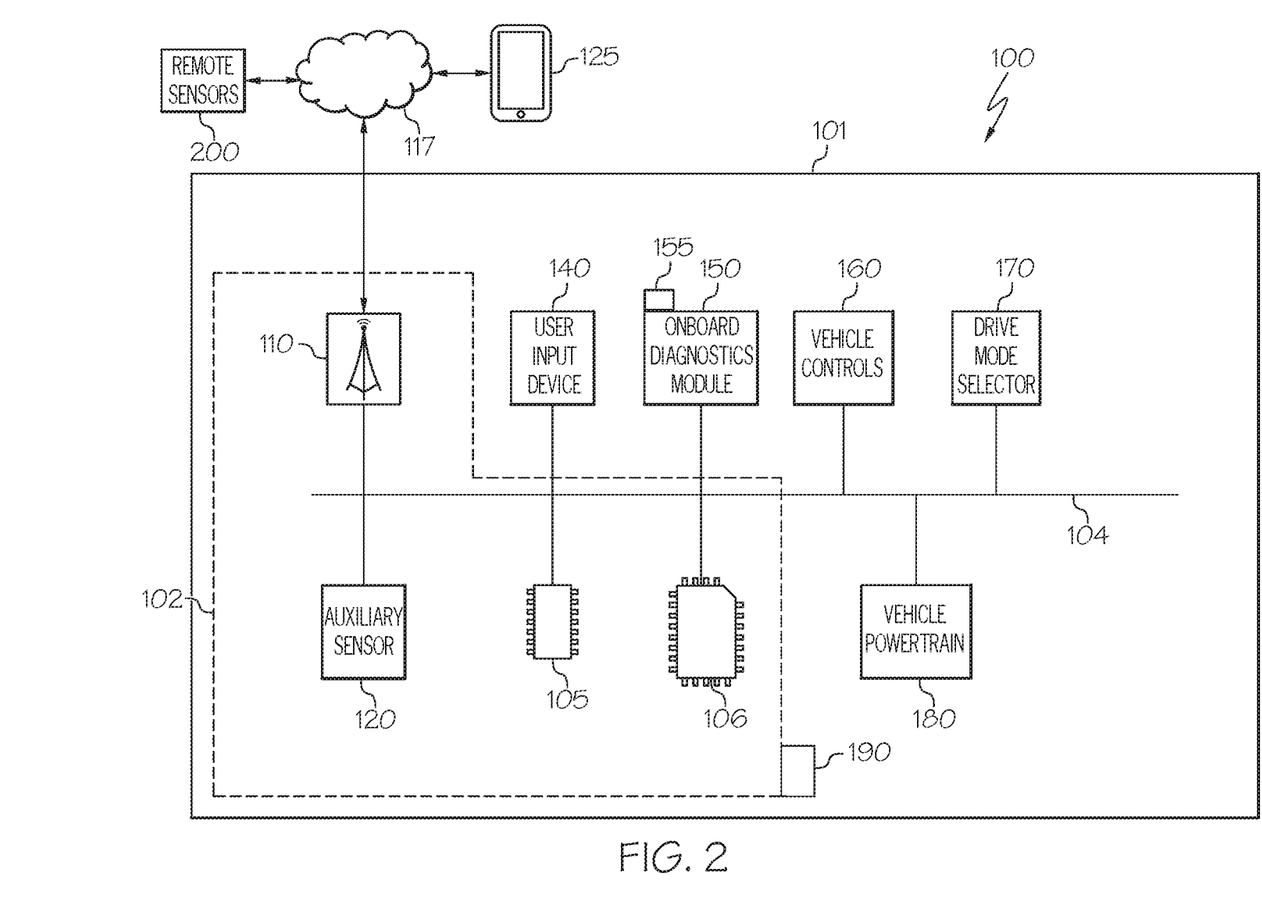
FIG. 2 depicts a schematic view of the vehicle of FIG. 1, according to one or more embodiments shown and described herein.

FIG. 2 generally depicts a schematic illustration of the system 101 of the vehicle 100. The system 101 generally includes a communication path 104, an authentication and verification module 102 (AVM 102), and an onboard diagnostics module 150. In some embodiments, the system 101 may further include a user input device 140, vehicle controls 160, a drive mode selector 170, and a vehicle powertrain 180.

The communication path 104 provides data interconnectivity between various modules disposed within the vehicle 100. Specifically, each of the modules can operate as a node that may send and/or receive data. In some embodiments, the communication path 104 includes a conductive material that permits the transmission of electrical data signals to processors, memories, sensors, and actuators throughout the vehicle 100. In another embodiment, the communication path 104 can be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors 105, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 2, the AVM 102 can be a computing device. For instance the AVM 102 can be any type of vehicle-installed, handheld, or other form of single computing device, or can be composed of multiple computing devices. In some embodiments, the AVM 102 can be pluggable into the system 101 of the vehicle 100. In some embodiments the AVM 102 may include multiple devices distributed in or outside the system 101. The AVM 102 generally includes one or more processors 105, one or more memory modules 106, network interface hardware 110, and one or more auxiliary sensors 120. The AVM 102 may be configured to communicate with a network 117 over the network interface hardware 110 to communicate with a remote server 200 to send information related to a driving behavior of the vehicle 100 (e.g., a driving behavior communication).

The one or more processors 105 may control various operations of the AVM 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The AVM 102 further includes one or more memory modules 106 communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the AVM 102 and/or external to the AVM 102. The one or more memory modules 106 may be configured to store one or more pieces of logic as described in more detail below. The embodiments described herein may utilize a distributed computing arrangement to perform any portion of the logic described herein.

Figure 3:
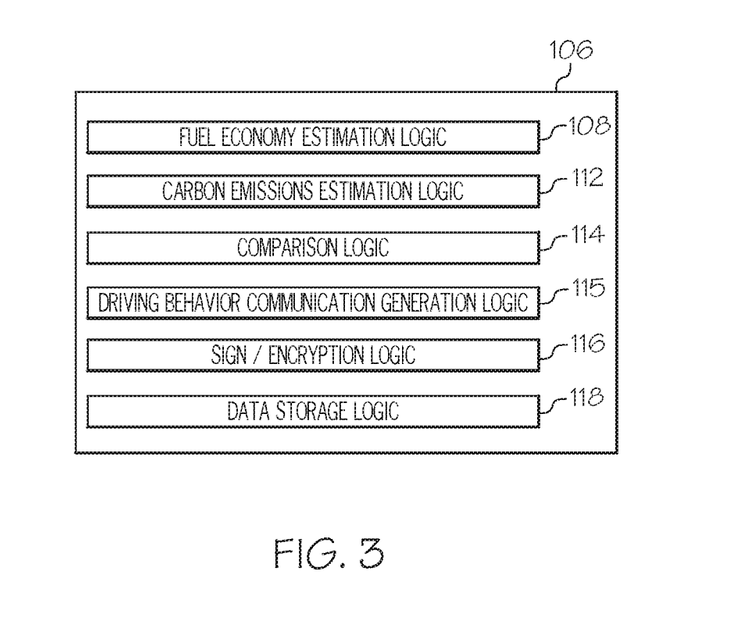
FIG. 3 depicts a schematic view of various logic within a memory module of the vehicle of FIG. 2, according to one or more embodiments shown and described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the one or more processors 105, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. With reference to FIG. 3, logic stored on the one or more memory modules 106 may include, for example, fuel economy estimation logic 108, carbon emissions estimation logic 112, comparison logic 114, driving behavior communication generation logic 115, signature/encryption logic 116, data storage logic 118, and the like. It is noted that the one or more memory modules 106 of the AVM 102 may not include each of the types of logic listed above. Instead, some calculations may not be performed by the AVM 102 and may instead be performed by the remote server 200. For example and not as a limitation fuel, economy estimations and carbon emissions estimations may be performed by the remote server 200.

Referring to FIGS. 2 and 3, the fuel economy estimation logic 108 may allow the AVM 102, based on signals received from the one or more auxiliary sensors 120 and/or the onboard diagnostics module 150, to calculate the fuel consumption of the vehicle 100 for a particular trip or series of trips. However, as noted above, fuel economy estimation may instead be performed at the remote server 200. The carbon emissions estimation logic 112 may allow the AVM 102, based on signals received from the one or more auxiliary sensors 120 and/or the onboard diagnostics module 150, to calculate the carbon emissions of the vehicle 100 for a particular trip or series of trips. However, as noted above, carbon emissions estimations may instead be performed at the remote server 200. In some embodiments, the AVM 102 may further use this information to determine whether the vehicle was driven in a green (i.e., environmentally friendly manner commensurate with electrical and/or hybrid vehicle standards) and may in some embodiments, calculate a credit to be received by the vehicle driver and/or the OEM.

The comparison logic 114 may allow the AVM 102 to compare the verification signal from the one or more auxiliary sensors 120 with a diagnostic signal from the onboard diagnostics module 150. In some embodiments, the diagnostic signal may include fuel economy estimations and carbon emissions estimations. In such case, the AVM 102 may first use fuel economy estimation logic 108 and/or carbon emissions estimation 112 to calculate fuel consumption and/or carbon emissions for comparison with fuel economy estimations and carbon emissions provided in the diagnostic signal. In other embodiments, the diagnostic signal may not include such calculations, and measurements from one or more diagnostic sensors 155 may be compared directly with corresponding measurements of the one or more auxiliary sensors 120. As noted above, the AVM 102 may execute logic to calculate as credit to be awarded to at least one of the vehicle operator and/or the OEM. This credit may be based on one of the diagnostic signal and the verification signal when the verification signal substantially corresponds to the diagnostic signal.

The data storage logic 118, may allow the AVM 102 to store trip summary information for every trip performed by the vehicle 100. The trip summaries may include information indicative of how the vehicle 100 was or is being driven during a particular trip or over a number of trips (e.g., aggressively or in a more environmentally friendly (green) manner). Such trip summaries may include a unique identifier for the vehicle 100 and or the vehicle owner/operator, the date and time (start and stop) of each trip, trip length, as well as any other information received from the onboard diagnostics module 150 and the one or more auxiliary sensors 120. In embodiments including fuel economy estimation logic 108 and carbon emissions estimation logic 112, the summaries may include fuel/electric energy consumption for the trip. The trip summaries may further include such information as a fraction of trip miles and/or time during which the driver chose to engage in a super-eco driving mode, a fraction of trip miles and/or time during which the information received from the one or more auxiliary sensors substantially corresponded/differed to the information received from the onboard diagnostics module, a fraction of trip miles and/or time during which there was a loss of data from the onboard diagnostics module 150 (e.g., a connection between the AVM 102 and the onboard diagnostics module 150 was lost), whether a particular trip was green (i.e., environmentally friendly as determined by government regulations) or not, and/or the calculation of any credits to be awarded. As will be described in greater detail below, the above described summaries may be included in a driving behavior communication sent to a remote server 200.

After every trip or at fixed period of time (e.g., hourly/daily), the driver behavior communication generation logic may cause the AVM 102 to send a driving behavior communication to a remote server 200. The driving behavior communication may include the trip summary information stored in the one or more memory modules 106 for all trips that have not previously been sent. In some embodiments, the driving behavior communication may only send a summary of every trip performed by the vehicle 100 since the last time the vehicle 100 was in for servicing. This may prevent instances where certain trips are un-reported. In some embodiments, a driving behavior communication may only be sent when it is determined that the diagnostic signal substantially corresponds (e.g., is within some predetermined threshold) with the verification signal output by the one or more auxiliary sensors. Where the diagnostic signal substantially differs (e.g., is outside of the predetermined threshold) from the verification signal, the driving behavior communication with those reported trips may not be sent until after the vehicle 100 has been serviced to determine why the diagnostic signal is not substantially corresponding to the verification signal. It may be determined that the diagnostic signal substantially corresponds with the verification signal when such signals match one another by at least about 90% (e.g., within about 95%).

Prior to sending the driving behavior communication, the signature/encryption logic 116 may allow the AVM 102 to sign and/or encrypt the driving behavior communication via a digital key. Such digital signatures/encryption assures the remote server 200 that the AVM 102 is the true author of the driving behavior communication and may allow only select servers to decrypt and verify the contents of the driving behavior communication.

It is noted that the one or more memory modules 106 may include enough capacity to retain trip summary information for a period of about 6 months to about 8 months or until the vehicle 100 has been serviced. As part of periodic servicing of the vehicle 100, determining and fixing causes of the diagnostic signal differing from the verification signal and resetting the one or more memory modules 106 to free up storage for additional trip summaries may be included. In some embodiments, servicing may include an additional level of cross validation wherein the service providers determine that the previously sent driving behavior communications match the trip summaries stored on the one or more memory modules 106.

Referring again to FIG. 2, the AVM 102 may further include network interface hardware 110 for communicatively coupling the AVM 102 with a network 117. The network interface hardware 110 can be communicatively coupled to the communication path 104 and can be any device capable of transmitting and/or receiving data via the network 117. Accordingly, the network interface hardware 110 can include a communication transceiver for sending and/or receiving any wired or wireless communication. For example, the network interface hardware 110 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 110 may include hardware configured to operate in accordance with the Bluetooth wireless communication protocol. The network interface hardware 110 may include a Bluetooth send/receive module for sending and receiving Bluetooth communications to/from the one or more mobile devices 125.

The AVM 102 may communicate, through the network interface hardware 110, with a network 117 to communicatively couple the AVM 102 with a remote server 200. For example, the remote server 200 may receive a driving behavior communication, as described above, from the AVM 102 indicative of how the vehicle 100 was or is being driven during a particular trip or over a number of trips (e.g., aggressively or in a more environmentally friendly (green) manner). In some embodiments, the network 117 may include a personal area network that utilizes Bluetooth technology to communicatively couple the AVM 102 with the one or more mobile devices 125 (e.g., a smart phone). In such embodiments, a portion of the AVM 102 may be incorporated into the one or more mobile devices 125. For example, the one or more auxiliary sensors 120 may be incorporated into the one or more mobile devices 125. In further embodiments, the network 117 may include one or more computer networks (e.g., a personal area network, a local area network, or a wide area network), cellular networks, satellite networks and/or a global positioning system and combinations thereof. Accordingly, the AVM 102 can be communicatively coupled to the network 117 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 4:
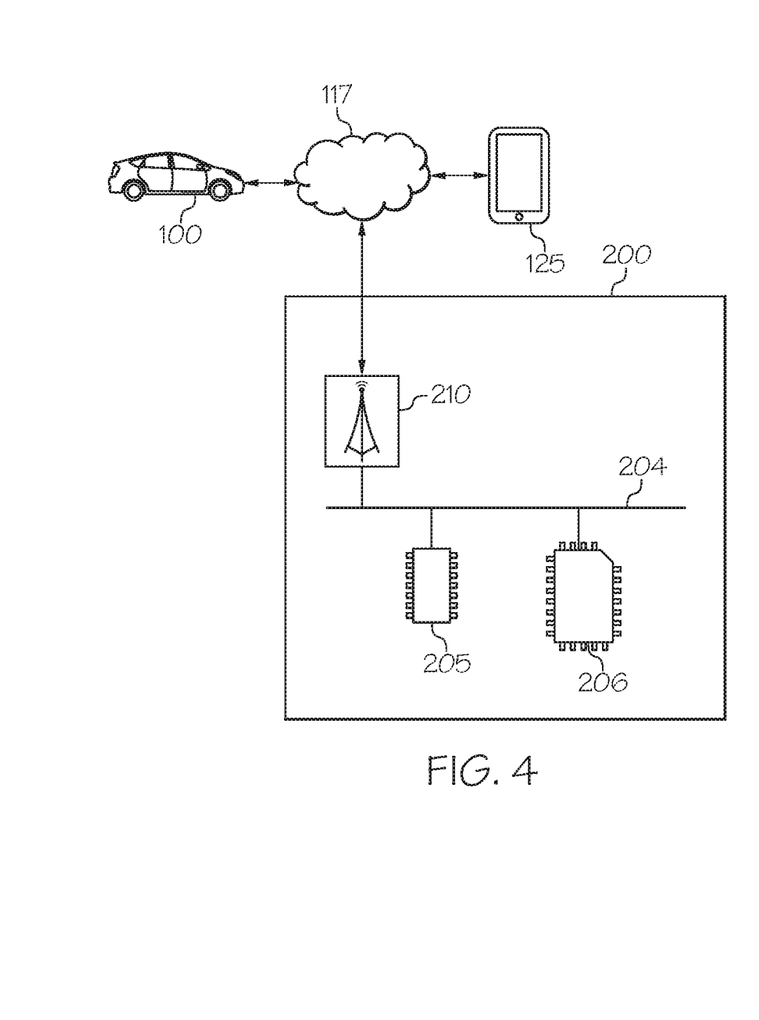
FIG. 4 depicts the remote server of FIG. 2, according to one or more embodiments shown and described herein.

As will be described in greater detail below, the AVM 102 may communicate through the network interface hardware 110, with the network 117 to communicatively couple the vehicle 100 with a remote server 200. Referring now to FIG. 4, the remote server 200 may generally include a processor 205, a memory 206, and chipsets for receiving the driving behavior communications as described herein. Based on the contents of the driving behavior communication, the remote server 200, or an operator at the remote server 200, may apply a credit to one of the driver, the OEM, or both to reward the driver or OEM for the vehicle 100 being operated in a green driving manner. A credit may take many forms. For example and not as a limitation the credit may be a monetary award, a tax credit, a rebate, or may be used to reduce a loan or lease of the vehicle 100.

Referring again to FIG. 2, the AVM 102 includes one or more auxiliary sensors 120. The one or more auxiliary sensors 120 may be configured to output a verification signal indicative of a driving behavior of the vehicle 100. For example, the one or more auxiliary sensors 120 may provide an output that is indicative of whether the vehicle 100 is being driven aggressively or in a more environmentally friendly (i.e., green) manner. As such, the verification signal may be indicative of at least one of fuel consumption and/or carbon emissions. The one or more auxiliary sensors 120 may include speed sensors, altitude sensors, acceleration sensors, breaking sensors, turning sensors, location sensors (e.g., GPS), pressure sensors, temperature sensors, humidity sensors, and the like. Based on the signals received from the one or more auxiliary sensors 120, the one or more processors 105 may execute logic to cause the AVM 102 to perform a variety of operations. For example, the one or more processors 105 may execute fuel economy estimation logic 108 to calculate the fuel consumption of the vehicle 100 on a particular trip of the vehicle 100. The one or more processors 105 may execute carbon emissions estimation logic 112 to calculate the carbon emissions of the vehicle 100 for the particular trip. However, as noted above, in some embodiments, such calculations may instead be performed by the remote server 200. The verification signal received from the one or more auxiliary sensors 120 may allow for cross-validation of information received from the onboard diagnostics module 150. In some embodiments, the one or more auxiliary sensors 120 may also include an onboard diagnostics module connect/disconnect sensors that output a signal indicative of the AVM 102 being communicatively coupled to the onboard diagnostics module 150. As will be explained in greater detail, when the AVM 102 is not able to communicate with the onboard diagnostics module 150, the AVM 102 will not be able to perform its cross-validation function. In such instances, the AVM 102 may generate and send a service request to a driver of the vehicle 100, such as, for example, over an infotainment system (not shown) of the vehicle 100.

In the embodiments described herein, the one or more memory modules 106, the one or more processors 105, the network interface hardware 110, and the one or more auxiliary sensors 120 are integral with the AVM 102. However, it is noted that the AVM 102, the one or more memory modules 106, the one or more processors 105, the network interface hardware 110, and the one or more auxiliary sensors 120 may be discrete components communicatively coupled to one another without departing from the scope of the present disclosure. For example, and as noted above, a portion of the AVM 102 (e.g., the one or more auxiliary sensors 120) may be incorporated into one or more mobile devices 125 (e.g., a smart phone). The AVM 102 may communicate with the one or more mobile devices 125 over the network interface hardware 110. In some embodiments, information recorded and/or received by the AVM 102 may be displayed on the one or more mobile devices 125 through an application loaded onto the one or more mobile devices 125.

Referring again to FIG. 2, the various modules, or at least some of the modules, of the AVM 102 may be coupled to a battery (not shown) of the vehicle 100. In some embodiments, the AVM 102 may have a back-up battery 190. The back-up battery 190 may provide power to the AVM 102 when the vehicle 100 is off or when the AVM 102 has lost connection to the vehicle's 100 battery. In some embodiments, there may be no back-up battery 190.

The system 101 may include one or more user input devices 140 coupled to the communication path 104 such that the communication path 104 communicatively couples the one or more user input devices 140 to other modules of the system 101. The one or more user input devices 140 may be any device capable of transforming mechanical, optical, or electrical signals into a data signal capable of being transmitted with the communication path 104. Specifically, the one or more user input devices 140 may include any number of movable objects that each transform physical motion into a data signal that can be transmitted to over the communication path 104 such as, for example, a button, a switch, a knob, a touchscreen, a microphone or the like. While the system 101 includes one or more user input devices 140 in the embodiment depicted in FIG. 2, the system 101 may not include one or more user input devices 140 in other embodiments. The one or more user input devices 140 may allow an authorized entity, such as an authorized service provider or OEM, to input information about the vehicle 100. For example, vehicle specifications including but not limited to, the size of the engine, the size of the tires, and the like. Such information may allow either the AVM 102 or the remote server 200 to better calculate carbon emissions and/or fuel consumption of the vehicle 100. In some embodiments, the vehicle specifications may already be stored/programmed onto the one or more memory modules 106 or within the onboard diagnostics module 150.

As noted herein above, the vehicle 100 includes an onboard diagnostics module 150 that outputs a diagnostic signal. The diagnostic signal may provide information indicative of at least one of fuel consumption and/or carbon emissions. The onboard diagnostics module 150 may include one or more diagnostic sensors 155. The one or more diagnostic sensors 155 may include sensors that are duplicative to the one or more auxiliary sensors 120 of the AVM 102. For example, the one or more diagnostic sensors 155 include speed sensors, altitude sensors, acceleration sensors, breaking sensors, turning sensors, location sensors (e.g., GPS), pressure sensors, temperature sensors, humidity sensors, and the like. In some embodiments, the one or more diagnostic sensors 155 may include different sensors than the one or more auxiliary sensors. In such cases, calculations may be done with the outputs of at least one of the one or more auxiliary sensors 120 and the one or more diagnostic sensors 155 to come such that corresponding values may be compared to one another (e.g., fuel consumption as determined from the output of the one or more diagnostic sensors 155 and fuel consumption as determine from the output of the one or more auxiliary sensors 120). As such, the diagnostic signal may include information indicative of fuel consumption and/or carbon emissions (e.g., throttle position, mass air flow rate to the engine, heating/air-conditioning, and the like). In some embodiments, the onboard diagnostics module 150 may include a processor and a memory, wherein the processor may execute logic stored on the memory to calculate, using the information received from the one or more diagnostic sensors 155, the fuel consumption or the vehicle 100 and/or the amount of carbon emissions produced by the vehicle 100. In some embodiments, the onboard diagnostics module 150 does not make such calculations.

In either case, the diagnostic signal of the onboard diagnostics module 150 may be communicated to the AVM 102. The AVM 102 may then execute comparison logic 114 to compare the diagnostic signal received from the onboard diagnostics module 150 to the verification signal received from the one or more auxiliary sensors 120. Where the diagnostic signal received from the onboard diagnostics module 150 includes a calculation of the vehicle's 100 fuel economy and/or carbon emissions, the AVM 102 may execute fuel economy estimation logic 108 and/or carbon emissions estimation logic 112 to calculate, using the verification signal, the fuel economy and/or carbon emissions of the vehicle 100 separately from the calculations performed by the onboard diagnostics module 150. In other embodiments, measurements taken by the one or more diagnostic sensors 155 are directly compared to measurements taken by the one or more auxiliary sensors 120. As will be explained in greater detail below, when the verification signal substantially corresponds (e.g., is approximately the same or within a predetermined threshold) to the diagnostic signal, a driving behavior communication may be transmitted to the remote server 200 by the AVM 102 with the network interface hardware 110. Where the verification signal and the diagnostic signal substantially differ from one another (e.g., the signals are outside of the predetermined threshold from one another), the AVM 102 may transmit a service request to at least one of a driver and the vehicle 100.

The system 101 may further include a vehicle powertrain 180 communicatively coupled to the other modules of the system 101 over the communication path 104. The vehicle powertrain 180 generally refers to the major components of the vehicle 100 to cause the vehicle 100 to drive. For example, the vehicle powertrain 180 may refer to the engine, transmission, drive shafts, differentials, battery, and the like. As will be described in greater detail below, the vehicle powertrain 180 may be controlled by the vehicle controls 160. Furthermore, in some embodiments, a drive mode selector 170 may control the vehicle controls to limit how the vehicle powertrain 180 is operated. For example, the drive mode selector 170 may have "super-eco" driving mode, which limits operation of the vehicle powertrain 180 to pre-determined green driving limits. Such limits may include speed, acceleration, and the like.

As noted above, the system 101 may include various vehicle controls 160 for controlling the vehicle powertrain 180. The vehicle controls 160 may include processors 105 that execute logic stored on memories to operate components of the vehicle powertrain 180 according to specific vehicle parameters as set by the drive mode selector 170.

The drive mode selector 170 may be coupled to the communication path 104 such that the communication path 104 communicatively couples the drive mode selector 170 to other modules of the system 101. The drive mode selector 170 may be any device capable of transforming mechanical, optical, or electrical signals into a data signal capable of being transmitted with the communication path 104. Specifically, the drive mode selector 170 may include any number of movable objects that each transform physical motion into a data signal that can be transmitted to over the communication path 104 such as, for example, a button, a switch, a knob, a touchscreen, a microphone or the like. The drive mode selector 170 may interact with the vehicle controls 160 to choose a drive mode of the vehicle 100. For example, a vehicle 100 may include a sports driving mode, an eco-driving/normal driving mode, and a super-eco driving mode. In some embodiments, the drive mode selector 170 could include a continuous dial that adjusts between varying levels of responsiveness running from "most responsive" to "most eco-friendly" (e.g., super-eco driving mode).

When a driver selects the super-eco driving mode with the drive mode selector 170, the vehicle controls 160 are automatically adjusted to more efficient regimes of operation, which may include, but are not limited to: reducing the maximum acceleration performance, reducing the maximum speed the vehicle will cruise at, and reducing the engine power when an upcoming stop is anticipated. In other words, vehicle 100 handling adjusts to a very fuel efficient driving mode when the vehicle is placed in the super-eco driving mode. Hence, the super-eco mode may have such characteristics as capping a maximum speed of the vehicle 100, providing a smooth acceleration, providing a smooth deceleration with the vehicle powertrain 180. It is noted that the described super-eco driving mode is exemplary in nature and that other types of vehicles may have other characteristics for driving in an eco-friendly manner. For example, eco-driving of a vehicle 100 with an internal combustion engine may differ from optimizing an HEV, PHEV, BEV, or other powertrain architecture. In any case, the AVM 102 may verify to various regulatory agencies or OEMs that the super-eco driving mode is meeting or exceeding driving expectations. Based on choosing the super-eco driving mode, a vehicle operator may receive a credit from a regulatory agency or the OEM. It is noted that choosing the super-eco driving mode may lengthen drive times by limiting the maximum speed of the vehicle 100 while improving vehicle fuel economy. Any percentage of increase in driving time may be offset by a greater than or equal increase in fuel economy. For example, an increase in driving time of about 15.0% (where the maximum speed was limited to about 55 mph and the maximum acceleration was limited to about 1.14 m/s$^2$) led to an improvement in fuel economy of about 19% to about 25%.

It is contemplated that a vehicle operator may switch from the above described super-eco driving mode to a faster, more responsive driving mode in a number of ways. For example, suddenly pressing the accelerator to the floor, making sharp steering wheel turns, or other driver inputs often associated with evasive/aggressive driving behaviors. Such activity for the driver of the vehicle may trigger an automatic shift from the super-eco driving mode to a more responsive driving mode. However, it is noted that a driver may switch back to the super-eco driving mode using the drive mode selector 170.

As noted hereinabove, the AVM 102 is configured to generate and transmit a driving behavior communication to a remote server 200. The driving behavior communication may provide information indicative of how the vehicle 100 is being driven (e.g., in an eco-friendly manner, or more aggressively.) Referring again to FIG. 4, the remote server 200 may include a communication path 204, a processor 205, a memory 206, and network interface hardware 210.

The communication path 204 provides data interconnectivity between various modules disposed within remote server 200. Specifically, each of the modules can operate as a node that may send and/or receive data. In some embodiments, the communication path 204 includes a conductive material that permits the transmission of electrical data signals to processors, memories, sensors, and actuators throughout the remote server 200. In another embodiment, the communication path 204 can be a bus, such as, for example, a LIN bus, a CAN bus, a VAN bus, and the like. In further embodiments, the communication path 204 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In some embodiments, the communication path 204 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The processor 205 may control various operations of the remote server 200. The processor 205 may include any device capable of executing machine-readable instructions stored on a non-transitory computer-readable medium. Accordingly, the processor 205 may include a controller, an integrated circuit, a microchip, a computer, and/or any other computing device.

The remote server 200 further includes a memory 206 communicatively coupled to the processor 205 over the communication path 204. The memory 206 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote server 200 and/or external to the remote server 200. The memory 206 may be configured to store one or more pieces of logic as described in more detail below. The embodiments described herein may utilize a distributed computing arrangement to perform any portion of the logic described herein.

Figure 5:
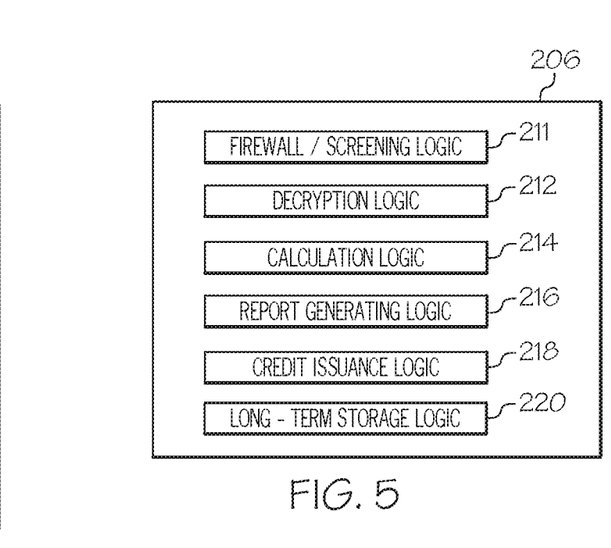
FIG. 5 depicts a schematic view of various logic within a memory of the remote server of FIG. 4, according to one or more embodiments shown and described herein.

Embodiments of the memory 206 of the remote server 200 include logic that includes machine-readable instructions and/or an algorithm written in any programming language of any generation (e.g., 1GL, 2GL, 3GL, 4GL, and/or 5GL) such as, machine language that may be directly executed by the processor 105, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. With reference to FIG. 5, logic stored on the memory 206 may include, for example, firewall/screening logic 211, decryption logic 212, calculation logic 214, report generating logic 216, credit issuance logic 218, long-term storage logic 220, and the like.

The firewall/screening logic 211 may allow the remote server 200 screen communications received over the network interface hardware 210 for possible viruses or malware to protect the remote server 200. The decryption logic 212 may allow the remote server 200 to decrypt a communication received over the network interface hardware 110 when the driving behavior communication has been encrypted. In some embodiments, the decryption logic 212 may also allow the remote server 200 to read a digital signature on the received driving behavior communication. The calculation logic 214, may allow the remote server 200 to calculate fuel consumption, carbon emissions, and the like from driving behavior communications received over the network interface hardware 210. In some embodiments, the calculation logic 214 may also allow the remote server 200 to calculate a credit to be received by one of the vehicle owner and/or the OEM. Such credit may be to award green driving behaviors (e.g., driving behaviors commensurate with fuel efficiency standards of a hybrid or electric vehicle, which may be set by government regulations) as determined from the driving behavior communication. The credit issuance logic 218 may allow the remote server 200 to automatically transmit the calculated credits to a preferred destination of the driver/vehicle owner and/or the OEM (e.g., bank account, PayPal® account, or even toward paying a vehicle's lease/loan). As such, the remote server, based on identifying information within the driving behavior communication, may determine the appropriate recipient of the credit. Receiving a credit may encourage the vehicle driver to continue driving in a manner commensurate with green driving behaviors. In instances wherein the driving behavior of the vehicle does not meet that of a hybrid and/or electric vehicle as set by state or federal regulations, no credit may be issued.

The report generating logic 216 may allow the remote server 200 to generate summary reports over a period of time (e.g. daily, weekly, monthly, etc.) of the behavior of a particular vehicle 100 and/or fleet of vehicles. The reports may include calculated credits. If the reports are not directly generated by a regulatory agency, but instead the OEM, the reports may be issued to a regulatory agency along with a request for an appropriate credit. Such reports may be limited to non-privacy revealing vehicle information. The long-term storage logic 220 may allow the remote server 200 to store copies of driving behavior communications received over the network interface hardware 110. The driving behavior communications can be stored "as is" to preserve authenticity of the driving behavior communication from the sender vehicle and to keep a record in the event that such records need to be recovered. Such long-term storage logic 220 may include backup and security protocols. Such storage, may aid in establishing the credibility of the summary reports sent to the regulatory agency. It is contemplated that original copies of the driving behavior communications may also be sent directly to a regulatory agency along with a summary report.

Referring again to FIG. 4, the remote server 200 further includes network interface hardware 210 for communicatively coupling the remote server 200 with the network 117. The network interface hardware 210 can be communicatively coupled to the communication path 204 and can be any device capable of transmitting and/or receiving data via the network 117. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 210 includes hardware configured to operate in accordance with the Bluetooth wireless communication protocol. In another embodiment, network interface hardware 210 may include a module for sending and receiving communications to/from the one or more mobile devices 125, for example when at least a portion of the AVM 102 is included in a mobile device 125. In further embodiments, the network 117 may include one or more computer networks (e.g., a personal area network, a local area network, or a wide area network), cellular networks, satellite networks and/or a global positioning system and combinations thereof. Accordingly, the remote server 200 can be communicatively coupled to the network 117 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The remote server 200 may communicate, through the network interface hardware 210, with the network 117 to communicatively couple the remote server 200 to the AVM 102 of a vehicle 100, such as illustrated in FIG. 2. As noted above, the remote server 200 may receive a driving behavior communication from the AVM 102 indicative of how the vehicle 100 is being driven during a particular trip (e.g., aggressively or in a more environmentally friendly (green) manner.) In some embodiments, the remote server 200 may send a message back to the vehicle 100 or to the one or more mobile devices 125 over the network interface hardware indicating whether the vehicle has been driven in a green manner or not. Such messages could be displayed on a display of the vehicle's 100 infotainment system or a display of the one or more mobile devices 125 to indicate to the driver that the vehicle 100 is meeting standards for green driving. For example, a leaf or other symbol may be displayed to the driver when the remote server 200 determines that the vehicle has been being driven in a green manner (e.g., when the driver/vehicle has earned a credit). In some embodiments, such as where the AVM 102 is configured to calculate a credit, where the vehicle/driver has earned a credit, a leaf or other symbol may be displayed to the driver to indicate that the vehicle 100 has been driven in a green manner.

Figure 6:
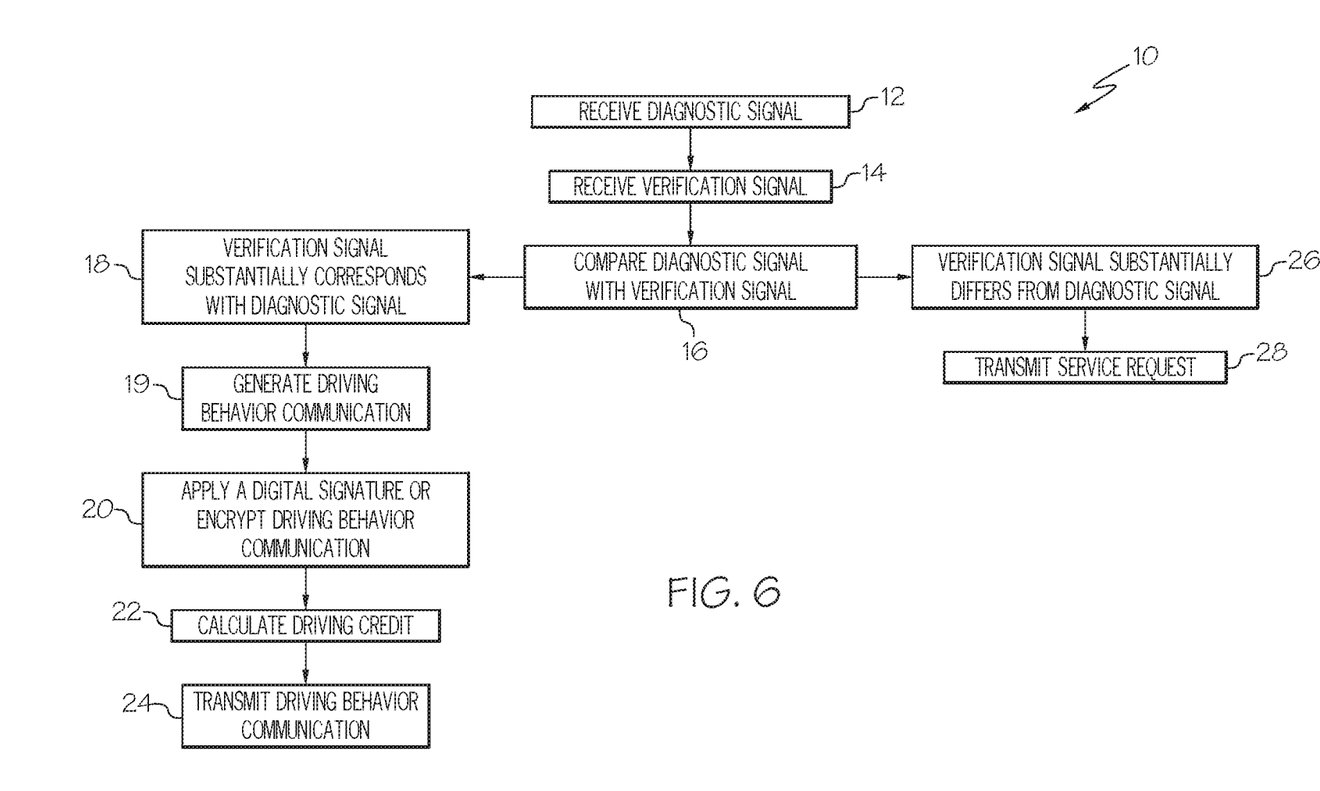
FIG. 6 illustrates a method for incentivizing green driving, according to one or more embodiments shown and described herein.

Referring now to FIG. 6, a method 10 of incentivizing green driving behavior is generally depicted. Though the steps shown in the method 10 appear in a certain order, this by no means limits when the various steps may take place unless noted otherwise. As such, the AVM 102 receives a diagnostic signal from the onboard diagnostics module 150 (block 12). The AVM 102 also receives a verification signal from the one or more auxiliary sensors 120 of the AVM 102 (block 14). The AVM 102 may then, in some embodiments, compare the diagnostic signal with the verification signal (block 16). It is noted that in some embodiments, the comparison of the diagnostic signal with the verification signal may instead take place at the remote server 200.

Where the verification signal substantially corresponds with the diagnostic signal (block 18), the AVM 102 may generate a driving behavior communication to be sent to the remote server 200 over the network interface hardware 110 (block 19). As noted herein, a verification signal is considered to substantially correspond to the diagnostic signal when the signals (being compared either directly or after a series of calculations) fall within some predetermined threshold of one another. For example, and not as a limitation, if the diagnostic signal of the onboard diagnostics module 150 indicates the fuel consumption of the vehicle 100 for a particular trip was 10 gallons and the one or more auxiliary sensors output a verification signal indicating that the fuel consumption of that particular trip was 10 gallons, then the AVM 102 may determine that the diagnostic signal and the verification signal substantially correspond to one another. However, even where the onboard diagnostic signal varies slightly from the verification signal, for example where diagnostic signal indicates 10 gallons and verification signal indicates 9.8, the AVM 102 may still determine that the diagnostic signal and the verification signal substantially correspond one another because the measurement may be within a predetermined threshold (e.g., within about 90% of on another). However, where the diagnostic signal and the verification signal fall outside of the predetermined threshold, for example where the diagnostic signal indicates 10 gallons and the verification signal indicates 20 gallons, the AVM 102 may determine that the diagnostic signal substantially differs from the verification signal. It is noted that in some embodiments, such comparisons may be done for each measurement of the vehicle diagnostic module and the one or more auxiliary sensors.

As noted herein the driving behavior communication may provide information relevant to how the vehicle 100 is or has been driven. The driving behavior communication may also include a unique identifier for identifying the vehicle 100 and/or driver/operator associated with the driving behavior communication. In some embodiments, the AVM 102 may apply at least one of a digital signature and/or encryption to the driving behavior communication prior to transmitting the driving behavior communication to the remote server 200 (block 20). Such signature may also be indicative of the sender (e.g. driver/operator/vehicle) from which the driving behavior communication originated. Such signature or encryption may also ensure that the driving behavior communication has not been tampered with. In some embodiments, the AVM 102 may execute logic to calculate a driving credit to be awarded to at least one of the vehicle owner/driver or an OEM (block 22). In other embodiments, the credit is calculated at the remote server 200. The driving behavior communication may be transmitted, over the network interface hardware 110, to the remote server 200 (block 24). The remote server 200 may belong to one of the OEM or a regulatory agency (e.g., the EPA). In some embodiments, the OEM may forward the driving behavior communication to the regulatory agency from the remote serve 200.

Where the verification signal substantially differs (e.g., is outside of a predetermined threshold, of which an example is provided above) from the diagnostic signal (block 26), the AVM 102 may determine that there is some issue with one of the AVM 102 or the onboard diagnostics module 150. For example, the AVM 102 may be disconnected from the onboard diagnostics module 150 or readings of the sensors from at least one of the onboard diagnostics module 150 and the AVM 102 have been tampered with. Under such circumstances, where the verification signal substantially differs from the diagnostic signal, the AVM 102 may generate and transmit a service request to one of the vehicle 100 owner or the vehicle 100 (block 28). Such request may be received and displayed over an infotainment system of the vehicle 100, or transmitted over the network interface hardware 110 to a mobile device 125 of the vehicle owner.

Though the above disclosure generally looks to fuel consumption/efficiency and carbon emissions as indicators of green driving, there may be other indicators of green driving. For example, the AVM 102 using GPS information and/or information received over the network interface hardware 110 may also compare driving behavior to posted speed limits, such that drivers driving substantially outside of the posted speed limits, though being more efficient than if driving within posted speed limits, are not rewarded with a credit in those instances. For example, a vehicle operator driving 60 mph in a 70 mph zone may be consuming more fuel relative to a vehicle operator driving 50 mph in a 35 mph zone, however, the first vehicle operator may be considered to be operating in a more environmentally friendly manner than the second vehicle operator. As such, in determining a whether or not a vehicle is being driven in a green manner, road parameters, such a posted speed limits, may also be taken into consideration in calculating a green driving credit.

It should now be understood the AVMs, systems, and methods of incentivizing green driving use an AVM to ensure credibility of measurements taken of a vehicle that may or may not be indicative of a green driving characteristic. These measurements may be transmitted to one of an OEM and/or some type of regulatory agency which may issue a credit to the owner of the vehicle (or the OEM) when the vehicle has been determined to be operating under green driving standards. By providing a validity check using the AVM to the measurements received from the vehicle, credit-applying agencies by be ensured that the measurements being received are correct. By providing credits to vehicle owners/operators, the vehicle owners/operators may be encouraged to continue or start operating their vehicles according to green standards.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An authentication and verification module for incentivizing green driving, comprising:
   one or more processors communicatively coupled to an onboard diagnostics module of a vehicle;
   network interface hardware communicatively coupled to the one or more processors and configured to communicate with a remote server;
   one or more auxiliary sensors communicatively coupled to the one or more processors and that output a verification signal indicative of a driving behavior of the vehicle; and
   one or more memory modules communicatively coupled to the one or more processors that store a threshold, a time period, and logic that, when executed by the one or more processors, cause the one or more processors perform the steps of:
   receiving a diagnostic signal from the onboard diagnostics module of the vehicle for the time period;

receiving the verification signal from the one or more auxiliary sensors for a concurrent time period;
determining a validity of the diagnostic signal by:
comparing the diagnostic signal with the verification signal;
identifying a difference between the diagnostic signal and the verification signal; and
comparing the difference between the diagnostic signal and the verification signal with the threshold to determine whether the diagnostic signal is valid; and
transmitting with the network interface hardware a driving behavior communication with the network interface hardware to the remote server in response to determining that the diagnostic signal is valid.

2. The authentication and verification module of claim 1, further comprising a mobile device housing at least one of the one or more processors, the network interface hardware, the one or more auxiliary sensors, and the one or more memory modules.

3. The authentication and verification module of claim 1, wherein the diagnostic signal and the verification signal are each indicative of at least one of fuel consumption and carbon emissions.

4. The authentication and verification module of claim 1, wherein the logic executed by the one or more processors further cause the one or more processors to perform the step of transmitting a service request to at least one of a driver and the vehicle when the diagnostic signal and the verification are outside of the threshold from one another.

5. The authentication and verification module of claim 1, wherein the logic executed by the one or more processors further cause the one or more processors to perform the step of applying one of a digital signature to the driving behavior communication and an encryption to the driving behavior communication prior to transmitting the driving behavior communication to the remote server to indicate that the driving behavior communication has not been tampered with.

6. The authentication and verification module of claim 1, wherein the one or more auxiliary sensors include at least one of a speed sensor, an acceleration sensor, and an altitude sensor.

7. The authentication and verification module of claim 1, wherein the logic executed by the one or more processors further cause the one or more processors to perform the step of receiving vehicle specifications from at least one of the onboard diagnostics module and one or more user input devices communicatively coupled to the one or more processors.

8. The authentication and verification module of claim 1, wherein the logic executed by the one or more processors further cause the one or more processors to perform the step of calculating a credit based on one of the diagnostic signal and the verification signal when the verification signal and the diagnostic signal are within the threshold from one another, wherein the driving behavior communication includes the credit.

9. A system for incentivizing green driving, comprising:
an onboard diagnostics module comprising one or more diagnostic sensors, wherein the onboard diagnostics module is configured to output a diagnostic signal;
network interface hardware communicatively coupled to the onboard diagnostics module and configured to communicatively couple the system with a remote server; and
an authentication and verification module communicatively coupled to the onboard diagnostics module, the authentication and verification module comprising:
one or more processors;
one or more auxiliary sensors communicatively coupled to the one or more processors for outputting a verification signal indicative of a driving behavior of the vehicle; and
one or more memory modules communicatively coupled to the one or more processors that store a threshold, a time period, and logic that, when executed by the one or more processors, cause the authentication and verification module to:
receive the diagnostic signal from the onboard diagnostics module of a vehicle for the time period;
receive the verification signal from the one or more auxiliary sensors for a concurrent time period;
determine a validity of the diagnostic signal by:
comparing the diagnostic signal with the verification signal;
identifying a difference between the diagnostic signal and the verification signal; and
comparing the difference between the diagnostic signal and the verification signal with the threshold to determine whether the diagnostic signal is valid; and
transmit with the network interface hardware a driving behavior communication with the network interface hardware to the remote server in response to determining that the diagnostic signal is valid.

10. The system of claim 9, wherein at least a portion of the authentication and verification module is included in a mobile device.

11. The system of claim 9, wherein the diagnostic signal and the verification signal are each indicative of at least one of fuel consumption and carbon emissions.

12. The system of claim 9, wherein the logic executed by the one or more processors further cause the authentication and verification module to transmit a service request to at least one of a driver and the vehicle when the diagnostic signal and the verification are outside of the threshold from one another.

13. The system of claim 9, wherein the logic executed by the one or more processors further cause the authentication and verification module to apply one of a digital signature to the driving behavior communication and an encryption to the driving behavior communication prior to transmitting the driving behavior communication to the remote server to indicate that the driving behavior communication has not been tampered with.

14. The system of claim 9, wherein the one or more auxiliary sensors include at least one of a speed sensor, an acceleration sensor, and an altitude sensor.

15. The system of claim 9, wherein the logic executed by the one or more processors further cause the authentication and verification module to receive vehicle specifications from at least one of the onboard diagnostics module and one or more user input devices.

16. The system of claim 9, wherein the logic executed by the one or more processors further cause the authentication and verification module to calculate a credit based on one of the diagnostic signal and the verification signal when the verification signal and the diagnostic signal are within the threshold from one another, wherein the driving behavior communication includes the credit.

17. A method for incentivizing green driving, the method comprising:
- receiving, with an authentication and verification module, a diagnostic signal from an onboard diagnostics module of a vehicle for a time period;
- receiving a verification signal from one or more auxiliary sensors for a concurrent time period;
- determining a validity of the diagnostic signal by:
  - comparing the diagnostic signal with the verification signal from the authentication and verification module;
  - identifying a difference between the diagnostic signal and the verification signal with the authentication and verification module;
  - comparing the difference between the diagnostic signal and the verification signal with a threshold to determine whether the diagnostic signal is valid; and
- transmitting a driving behavior communication with the authentication and verification module to a remote server when the verification signal and the diagnostic signal are within a threshold from one another; and
- transmitting service request with the authentication and verification module to at least one of a driver and the vehicle in response to determining that the diagnostic signal is valid.

18. The method of claim 17, further comprising applying, with the authentication and verification module, one of a digital signature to the driving behavior communication and an encryption to the driving behavior communication prior to transmitting the driving behavior communication to the remote server to indicate that the driving behavior communication has not been tampered with.

19. The method of claim 17, further comprising calculating a credit, with the authentication and verification module, based on one of the diagnostic signal and the verification signal when the verification signal and the diagnostic signal are within the threshold from one another, wherein the driving behavior communication includes the credit.

* * * * *

UNITED STATES PATENT AND TRADEMARK OFFICE
CERTIFICATE OF CORRECTION

PATENT NO. : 12,387,223 B2
APPLICATION NO. : 15/471770
DATED : August 12, 2025
INVENTOR(S) : Ken Laberteaux and Karim Hamza Page 1 of 1

It is certified that error appears in the above-identified patent and that said Letters Patent is hereby corrected as shown below:

In the Specification

In Column 9, Line 45, after "sensors 155", delete "to come".
In Column 14, Line 39, after "been", delete "being".
In Column 16, Line 13, after "determining", delete "a".
In Column 16, Line 27, after "agencies", delete "by" and insert --may--, therefor.

In the Claims

In Column 16, Line 64, Claim 1, after "processors", insert --to--.
In Column 18, Line 43, Claim 12, after "verification", insert --signal--.

Signed and Sealed this
Fourteenth Day of October, 2025

John A. Squires
*Director of the United States Patent and Trademark Office*